United States Patent [19]

Yu

[11] Patent Number: 5,380,100
[45] Date of Patent: Jan. 10, 1995

[54] SQUEEZE FILM DAMPER COVERED BY TORUS SHELLS

[76] Inventor: Han J. Yu, 9312 Notre Dame Ave., Chatsworth, Calif. 91311

[21] Appl. No.: 191,594

[22] Filed: Feb. 4, 1994

[51] Int. Cl.⁶ .................................. F16C 27/00
[52] U.S. Cl. ........................... 384/99; 267/113
[58] Field of Search ............ 384/99, 220, 215, 535, 384/581; 267/113

[56] References Cited

U.S. PATENT DOCUMENTS

| | | | |
|---|---|---|---|
| 421,089 | 2/1890 | Wood . | |
| 2,631,901 | 3/1953 | Holben et al. . | |
| 3,091,103 | 5/1963 | Goodwin | 267/113 |
| 3,415,470 | 12/1968 | Woodford et al. | 248/5 |
| 4,134,309 | 1/1979 | Balke et al. | 74/573 F |
| 4,213,661 | 7/1980 | Marmol . | |
| 4,781,077 | 11/1988 | El-Sahfei | 74/573 F |
| 5,211,489 | 5/1993 | Moore | 384/585 |
| 5,228,784 | 7/1993 | Bobo | 384/99 |

*Primary Examiner*—Lenard A. Footland

[57] ABSTRACT

A squeeze film damper covered by a pair of flexible torus shells, wherein the damping fluid is confined. The squeeze film provides the damping. The torus shells provide the stiffness within the clearance of the squeeze film. The torus shells separate the damping fluid from its environment. The torus shells also serve as a damping fluid reservoir.

9 Claims, 3 Drawing Sheets

SQUEEZE FILM DAMPER COVERED BY TORUS SHELLS

BACKGROUND OF THE INVENTION

1. Field of Invention

The present invention relates to the squeeze film damper to be used as a rolling element bearing support.

2. Prior Knowledge

The damping effect of the squeeze film is well known. In the past, the squeeze film was not covered or covered by ring type seals to allow the radial movements of the rolling element bearings. It has the following disadvantages:

a) It does not have stiffness within the clearance of the squeeze film, unless an extra structure is added.
   b) It can not be used if the damping fluid is required to be separated from its environment.
   c) The damping fluid is supplied with high pressure and is spilled out of the damper. The fluid is not always present, i.e. the damper has a risk of damping fluid starvation especially during startup, acceleration, and shutdown. Without the fluid, the damper does not function.

U.S. Pat. No. 421,089 used squeeze film in the journal bearing as early as 1890. U.S. Pat. No. 2,631,901 used a combined viscose and squeeze film damping device in 1953. U.S. Pat. No. 4,781,1077 is an intershaft squeeze film damper designed in 1988. In none of above patents, a device is included in the design which may control the spill out of the damping fluid.

U.S. Pat. No. 4,134,309 is a flexible support of the rolling element bearings with an O-ring on one side and a fluid filled annular reservoir on the opposite side designed in 1979. U.S. Pat. No. 4,213,661 used end seals, such as piston ring type seals, to prevent the escape of fluid from the damper in 1980. U.S. Pat. No. 3,415,470 of 1968 is a fluid filled mounting system, not a system for a rolling element bearing support and does not use squeeze film. In other bearing support designs, U.S. Pat. No. 5,211,489 is a radial spline assembly to provide stiffness and damping designed in 1993.

No squeeze film damper is known, however, that is covered by torus shells, so that the torus shells provide stiffness within the clearance of squeeze film, separate damping fluid from its environment, and provide a damping fluid reservoir.

SUMMARY OF THE INVENTION

The squeeze film damper functions by providing a squeeze film and a pair of flexible torus shells wherein the damping fluid is confined. The squeeze film provides the damping. The torus shells accommodate axial, radial, and rotational movements of the rotor, maintaining stiffness within the clearance of the squeeze film. The torus shells separate the damping fluid from its environment. The torus shells also serve as a damping fluid reservoir.

OBJECTS OF THE INVENTION

The principal object of the present invention is to introduce a squeeze film damper into a rotor. This is very desirable to reduce the vibration amplitudes, so that the bearing life can be increased and the noise level can be reduced.

It also is an object of the present invention to provide such a device which has axial, radial, and rotational stiffness within the clearance of the squeeze film, to separate the damping fluid from its environment, and to eliminate the risk of fluid starvation in a simple and effective way.

Other objects, advantages and novel features of the present invention will become apparent from the following detailed description of the invention when considered in conjunction with the accompanying drawings.

DETAILED DESCRIPTION

Figure 1:
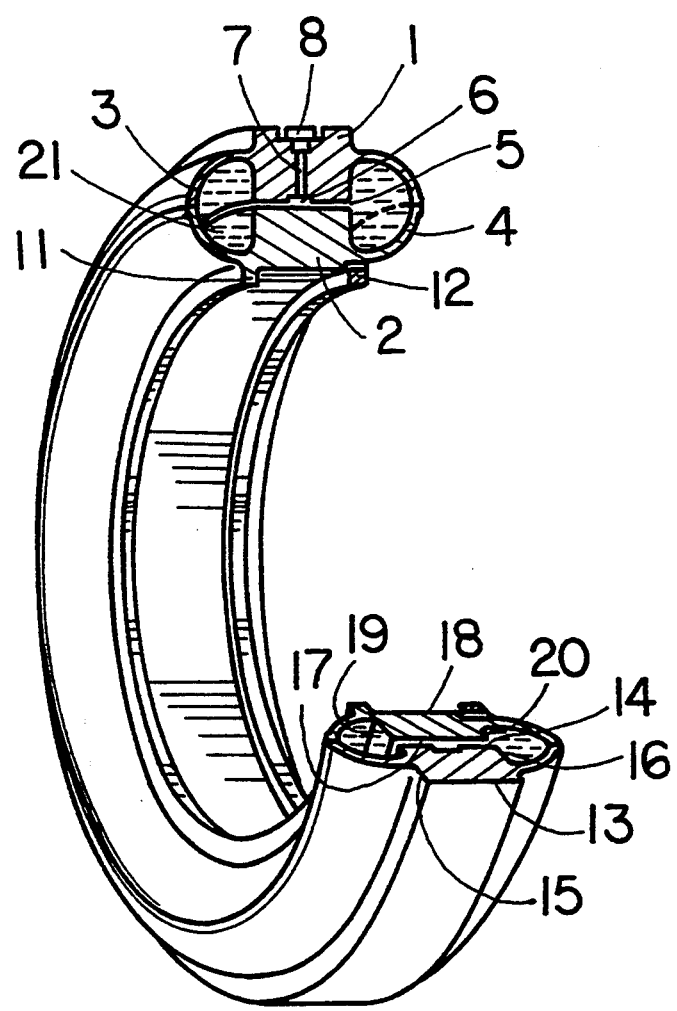
FIG. 1 is an isometric cut-away view of the squeeze film damper with torus shells.

The squeeze film damper of the present invention is to be used as a rolling element bearing support. As shown in the drawings, it includes a damper outer ring 1 and a damper inner ring 2, whereby a squeeze film 5 is provided between the two rings. A rolling element bearing 22 is mounted inside the inner ring 2. The said damper inner and outer rings are connected via a pair of torus shells 3 and 4. The damping fluid 21 is confined inside the torus shells.

The damper outer ring 1 has an outside surface 13, an inside surface 14, a first side surface 15, and a second side surface 16. The recess 6 on the inside surface 14 of the outer ring 1 will help the damping fluid be distributed evenly.

The damper inner ring 2 has an outside surface 17, an inside surface 18, a first side surface 19, and a second side surface 20. To locate the rolling element bearing 22, the retaining rib 11 is machined on one side of the inner ring 2. On the other side, the bearing retainer ring 12 is provided.

The inside surface 14 of the damper outer ring 1 is proximate the outside surface 17 of the damper inner ring 2 so that a clearance 5 is provided for a squeeze film between the two rings.

The damper outer ring 1 and the damper inner ring 2 can be made of elastic material, preferably a metallic material, that is stable and strong in its environment.

The torus shell 3 connects the first side surface 15 of the damper outer ring 1 to the first side surface 19 of the damper inner ring 2. The torus shell 4 connects the second side surface 16 of the damper outer ring 1 to the second side surface 20 of the damper inner ring 2. The torus shells 3 and 4 are made of elastic material that is stable and strong in its environment and provides flexibility.

In the designs of FIGS. 1 through 5, the damper outer ring 1 and the damper inner ring 2 are machined each with a pair of half torus shells and the two pairs of half torus shells are welded.

The damping fluid 21 should be a viscose fluid. It can be any one of many petroleum oils. The choice of fluid is determined by the quantity of damping required.

Figure 3:
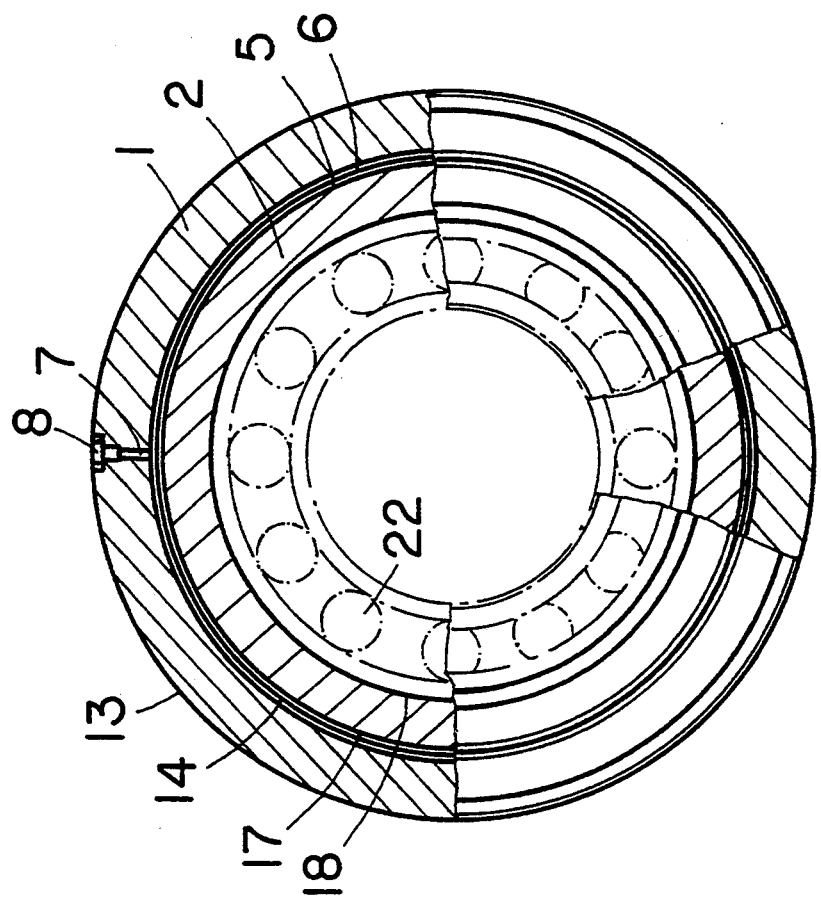
FIG. 3 is a front cut-away view of the squeeze film damper with torus shells, a fluid supply hole, and a plug shown with a ball bearing.
Figure 2:
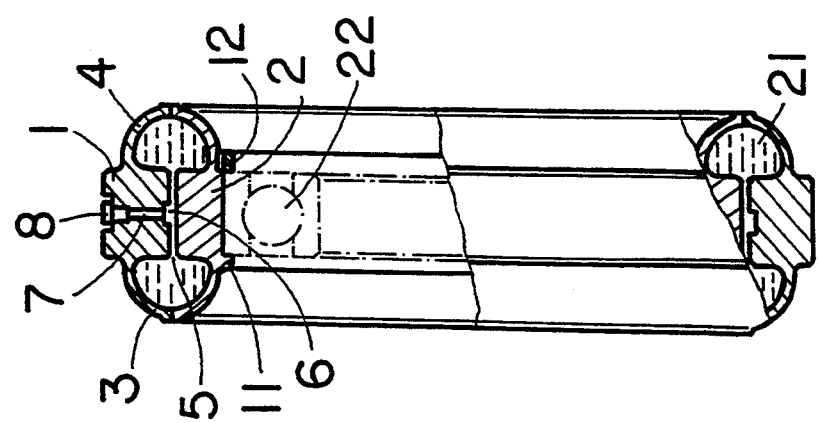
FIG. 2 is a side cut-away view of the squeeze film damper with torus shells, a fluid supply hole, and a plug shown with a ball bearing.

In a preferred embodiment, the damper is filled with damping fluid and completely sealed. As shown in FIGS. 2 and 3, a fluid supply hole 7 is drilled. The fluid supply hole connects the outside surface 13 and the inside surface 14 of the outer ring 1. To seal the damper a plug 8 is provided.

Figure 5:
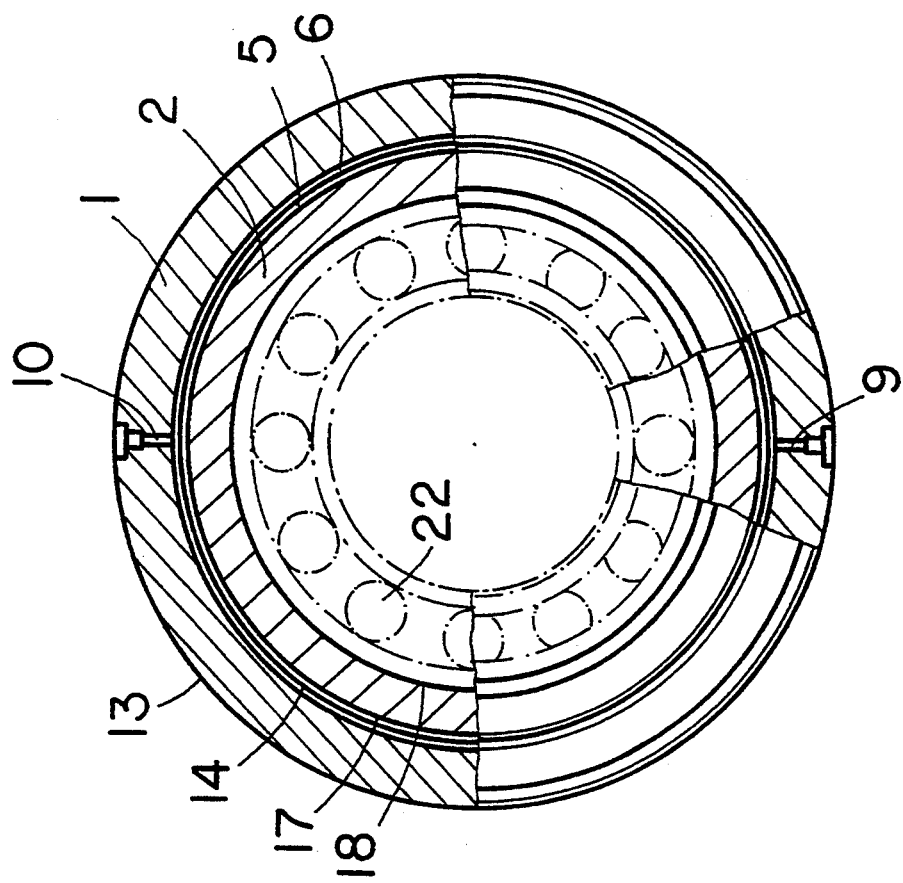
FIG. 5 is a front cut-away view of the squeeze film damper with torus shells, a fluid supply hole, and a fluid discharge hole shown with a ball bearing.
Figure 4:
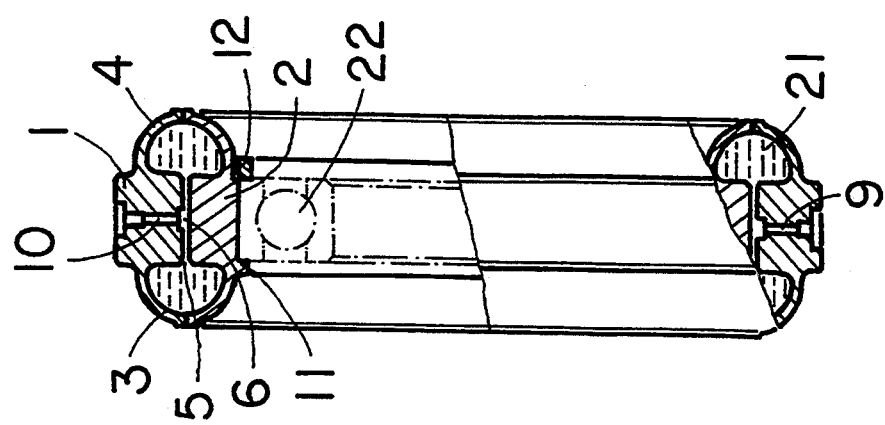
FIG. 4 is a side cut-away view of the squeeze film damper with torus shells, a fluid supply hole, and a fluid discharge hole shown with a ball bearing.

In an alternative embodiment, the fluid is supplied and discharged continuously during operation. As shown in FIGS. 4 and 5, a fluid supply hole 9 and a discharge hole 10 are drilled. Both holes connect the outside surface 13 and the inside surface 14 of the outer ring 1. The size and location of the holes are optimized so that the fluid is distributed evenly during operation and stays in the damper after the shutdown of the fluid supply system.

During operation, the squeeze film will damp out the vibration of the rotor. The vibration amplitudes of the rotor will be reduced so that the bearing life can be increased and the noise level can be reduced.

During operation, the flexible torus shells 3 and 4 accommodate axial, radial, and rotational movements of the rotor, maintaining stiffness within the clearance of the squeeze film. The stiffness, and therefore also the flexibility, is determined by the elasticity of the material, the size and shape of the cross section, and the wall thickness of the torus shells. The omega ($\Omega$) shaped cross section of the torus shell, as shown in FIGS. 1, 2, and 4, will minimize the stress concentration providing maximum flexibility during the movement of the damper inner ring against the damper outer ring.

The torus shells 3 and 4 separate the damping fluid from its environment. The squeeze film damper of this invention can be used also in chemical pumps or in food processing machineries where a clean operation is required. The torus shells capture the damping fluid escaping from the squeeze film and serve as a reservoir. The damping fluid is present always in the torus shells and in the clearance of the squeeze film, therefore the risk of fluid starvation is eliminated which is a disadvantage in the prior art.

The clearance of the squeeze film is less than 0.005 inch in general applications. The movement of the damper inner ring is limited to the clearance. Therefore, the stress at the torus shell will not be increased to a level, where the fatigue damage may be significant.

During operation, the damping energy will be transformed into heat and raise the fluid and torus shell temperatures. The generated heat will be dissipated through heat transfer. The damper will not be heated up to a very high temperature because: a) At higher temperatures, most of the damping fluid is less viscose and therefore, the damper will generate less heat. b) The heated up damper will be cooled faster.

During operation, if the damping fluid is supplied and discharged continuously, the generated heat will be transported away with the damping fluid.

The dimensions of the squeeze film and the shape and size of the torus shells can be adjusted to the vibration characteristics of the rotor, to the stress level, and to the available space. It will be obvious to those skilled in the art that various changes may be made without departing from the scope of the invention and the invention is not to be considered limited to what is shown in the drawings and described in the specification.

What is claimed is:

1. A squeeze film damper comprising
   a damper outer ring having an outside surface, an inside surface, a first side surface, and a second side surface,
   a damper inner ring having an outside surface, an inside surface, a first side surface, and a second side surface,
   whereby the damper outer ring inside surface is proximate the damper inner ring outside surface so that a clearance of the squeeze film is provided,
   and a pair of torus shells, one connecting the first side surface of the damper outer ring and the first side surface of the damper inner ring, and one connecting the second side surface of the damper outer ring and the second side surface of the damper inner ring, so that the torus shells provide the stiffness within the clearance of the squeeze film, separate the damping fluid from its environment, and serve as a damping fluid reservoir.

2. The squeeze film damper of claim 1, further characterized by a fluid supply hole connecting the inside surface and
   the outside surface of the outer ring and a plug to seal the damper completely.

3. The squeeze film damper of claim 2, further characterized by a bearing retaining rib
   and a bearing retainer ring.

4. The squeeze film damper of claim 2, further characterized by a recess to distribute the damping fluid evenly.

5. The squeeze film damper of claim 4, further characterized by a bearing retaining rib
   and a bearing retainer ring.

6. The squeeze film damper of claim 1, further characterized by a fluid supply hole
   and a fluid discharge hole, each connecting the inside surface and the outside surface of the damper outer ring to supply and discharge fluid continuously during operation.

7. The squeeze film damper of claims 6, further characterized by a bearing retaining rib
   and a bearing retainer ring.

8. The squeeze film damper of claim 6, further characterized by a recess to distribute the damping fluid evenly.

9. The squeeze film damper of claim 8, further characterized by a bearing retaining rib
   and a bearing retainer ring.

* * * * *